United States Patent [19]

Raptis

[11] 4,402,230

[45] Sep. 6, 1983

[54] METHOD AND APPARATUS FOR MEASURING FLOW VELOCITY USING MATCHED FILTERS

[76] Inventor: Apostolos C. Raptis, Downers Grove, Ill., Granted to U. S. Department of Energy under the provisions of 42 U.S.C. 2182

[21] Appl. No.: 284,050

[22] Filed: Jul. 17, 1981

[51] Int. Cl.³ .................................................. G01F 1/74
[52] U.S. Cl. ............................. 73/861.04; 73/861.06
[58] Field of Search ..................... 73/861.04, 861.06; 364/510

[56] References Cited

U.S. PATENT DOCUMENTS

| Re. 28,686 | 1/1976 | Coulthard . |
| 3,595,078 | 7/1971 | Beck et al. |
| 3,621,710 | 11/1971 | Day et al. ........................ 73/861.04 |
| 3,813,939 | 6/1974 | Head . |
| 3,819,919 | 6/1974 | McGunigle . |
| 3,844,170 | 10/1974 | Critten . |
| 3,967,500 | 7/1976 | Forster . |
| 4,007,754 | 2/1977 | Beck et al. |
| 4,019,038 | 4/1977 | Critten et al. |
| 4,056,002 | 11/1977 | Arieh et al. |
| 4,096,745 | 6/1978 | Rivkin et al. |
| 4,145,924 | 3/1979 | Müller . |
| 4,228,353 | 10/1980 | Johnson . |

*Primary Examiner*—Charles A. Ruehl
*Attorney, Agent, or Firm*—Bruce R. Mansfield; Paul A. Gottlieb; Richard G. Besha

[57] ABSTRACT

An apparatus and method for measuring the flow velocities of individual phase flow components of a multiphase flow utilizes matched filters. Signals arising from flow noise disturbance are extracted from the flow, at upstream and downstream locations. The signals are processed through pairs of matched filters which are matched to the flow disturbance frequency characteristics of the phase flow component to be measured. The processed signals are then cross-correlated to determine the transit delay time of the phase flow component between sensing positions.

6 Claims, 8 Drawing Figures

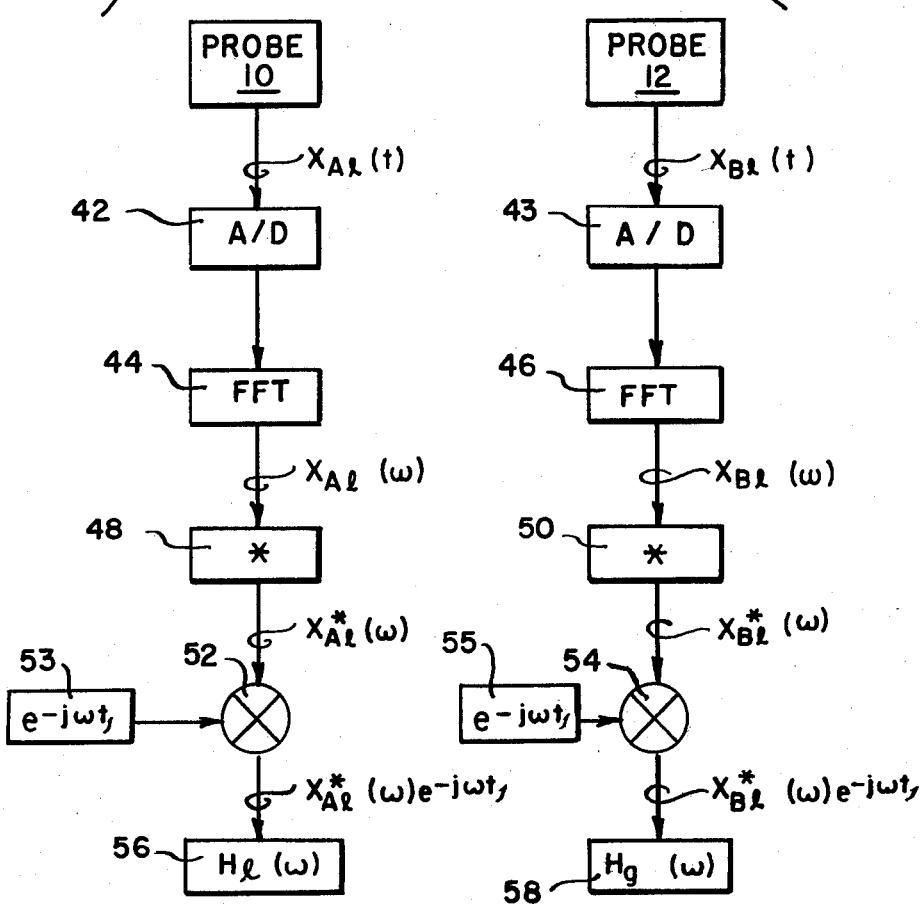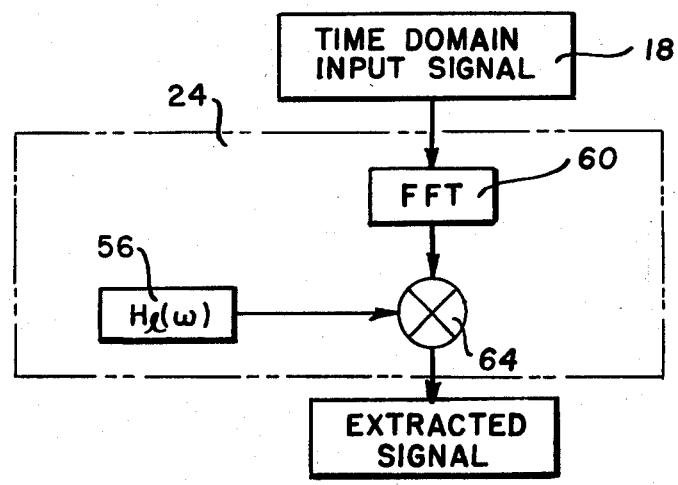

METHOD AND APPARATUS FOR MEASURING FLOW VELOCITY USING MATCHED FILTERS

CONTRACTUAL ORIGIN OF THE INVENTION

The U.S. Government has rights in this invention pursuant to Contract No. W-31-109-ENG-38 between the U.S. Department of Energy and Argonne National Laboratory.

BACKGROUND OF THE INVENTION

This invention relates generally to a method and apparatus for determining the individual phase flow velocities in multiphase flow systems. The invention has particular application in light water nuclear reactors. There are many industrial applications for improved methods of measuring multiphase flow. Such improved methods are needed for the continued development of mathematical models to predict flow fluid parameters in applications such as nuclear reactor systems, heat exchangers in the process industry, safety relief valves and steam generators. They are also needed to verify computer models based on individual phase flow velocities of multiphase media, where the component velocities that are not known, but are inferred from mixed flow measurement techniques. Such computer programs are used in the optimization and safety analysis of nuclear plants, as well as maintaining an acceptable materials balance in coal conversion plants. Knowledge of individual phase flow velocities will benefit computer programs in which all equations are written for individual phase flow velocities. Also, in the area of nuclear reactor design and operation, knowledge of individual phase velocities in circular pipes can be used through known extrapolation techniques to predict reactor core phenomena such as pressure and the departure of nuclear boiling regimes.

To date, cross-correlation of signals from thermocouples, impedance probes, accoustic transducers, and various other devices has been used to determine mixed phase flow velocities. The cross-correlation method works well in homogeneous single-phase media, but it is ill-suited for non-homogeneous multi-phase flow conditions since only a "transport" mixed phase velocity (i.e., an average velocity somewhere between the liquid phase and gas-phase flow velocities) is rendered by the cross-correlation method. There is no method known to date by which the mixed-phase velocity value can be related to one or more individual phase flow velocities. The same shortcoming is experienced in systems having solid/gas and solid/liquid as well as liquid/gas multiphase flows.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

With the present invention, individual phase velocities are determined using matched filter techniques to identify the spectral signals of each phase flow component. Matched filter techniques were first developed for radar communications during World War II, and in the following years were extended to communication theory and to the pulse-compression technique for propogation of electromagnetic waves through dispersive media. Initially, matched filters were developed to extract signals corrupted by noise, into a form suitable for making optimum detection decisions. The concept of a matched filter which is treated here from a systems point of view, will not be explained in great detail since a more complete understanding of matched filters can be attained with reference to the existing literature.

The present invention provides for a method and apparatus for measuring the individual phase flow velocities in a multiphase flow using the concept of matched filters. These types of filters operate on the principle that the output frequency characteristics of an optimal receiver must be the complex conjugate of the received signal spectrum. The transmitted signal may be of either the accoustical or optical type. Once the frequency characteristics of each phase of a multiphase flow are determined either experimentally or through known statistical techniques, then separate matched filters are developed for each phase of the flow. The matched filters provided for each receiver of a given phase flow component isolate and enhance the signals generated from that phase. To measure flow velocities, upstream and downstream arrays of receivers are monitored, and their output signals are cross-correlated to obtain the transit delay between receiver arrays.

DESCRIPTION OF THE DRAWINGS

FIG. 7 is a flow diagram of a procedure to design a matched filter.

FIG. 8 is a flow diagram showing a matched filter of FIG. 1 in greater detail.

DETAILED DESCRIPTION OF THE PREFERRED EMBODIMENT

The invention will be explained with reference to a non-homogeneous two-phase (liquid-gas) flow, although the invention pertains as well to three-phase and higher order flows as well. Also, for the purposes of illustrating a particular matched filter design, it will be assumed that the phase flow components each have a linear spectral characteristic. The concept of matched filters, however, applies equally well to flows having non-linear frequency characteristics.

Upstream and downstream matched filter receivers are provided to detect the transit delay of either an inherent naturally occuring random noise of a flow phase (a passive measuring system) or a transmitted beam of radiant energy injected into and coupled through the various phases of a flow (an active measuring system). The choice between an active and a passive flow measuring system depends upon the usual consideration of the nature of the media of each phase flow component, i.e., whether the media acts as a compression network or not. A passive flow measuring system is described herein in which the frequency characteristics of each phase flow components must be sampled or otherwise determined. According to matched filter theory, the output frequency characteristics of an optimal receiver (i.e. a receiver having a matched filter) are the complex conjugate of the frequency characteristics detected by a transducer sensor. Once the frequency characteristic of a particular phase is determined, identical upstream and downstream matched filters are designed using either an electronic circuit model or a computer model. In the electronic circuit model approach, the filters are then constructed for each phase using active or passive network analysis techniques. In either approach, matched filters are located at both upstream and downstream monitoring positions to process the detected or sampled signal. The detected signal for each phase and for each monitoring location is isolated and enhanced by the particular matched filter. The upstream and downstream enhanced output signals from the matched filters are then cross-correlated using conventional techniques to determine the transit delay between flow monitoring points.

Figure 1:
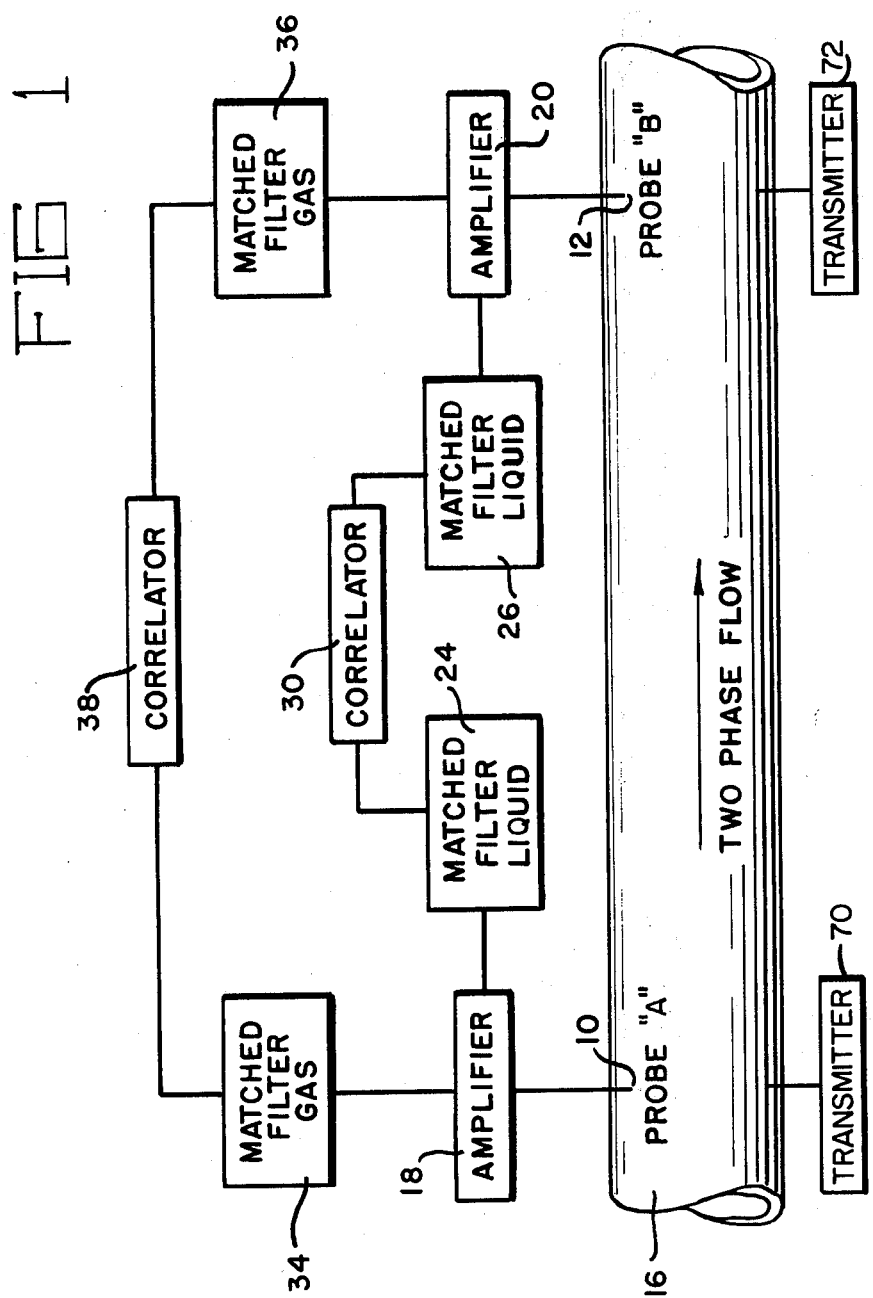
FIG. 1 is a schematic diagram of an arrangement for measuring flow velocity in a two-phase flow.

With reference to FIG. 1, a schematic diagram of a flow measuring system according to the invention is shown comprising upstream and downstream transducers or probes 10, 12 installed within a pipe 16 to detect the spectral energy of a two-phase (liquid-gas) flow contained in the pipe. Probes 10, 12 are of broad band design, adequate to detect the frequency information of all phase flow components. Probes 10, 12 may be either of known optical, thermal or acoustical types but are preferably acoustical. The signals of probe 10, 12 are fed into amplifiers 18, 20 respectively, which split the signals into two separate channels. The first channel, corresponding to the liquid phase, comprises upstream and downstream matched filters 24, 26 respectively, connected to a first cross-correlator 30. Similarly, the second channel comprises upstream and downstream matched filters 34, 36 connected to a second cross-correlator 38. Matched filters 24, 26 are identical to each other and are matched to the frequency characteristics of the liquid phase. Likewise, mutually identical filters 34, 36 are matched to the frequency characteristics of the gaseous or steam phase. Matched filters 24, 26 receive the entire flow spectrum at their respective inputs, producing the isolated liquid phase frequency spectrum at their output. Cross correlator 30, of conventional design, is employed to determine the transit delay of the liquid phase between probes 10, 12. The second channel, consisting of filters 34, 36, and cross-correlator 38, functions in a manner similar to the first channel, except it extracts and enhances the gaseous or steam phase.

The first step in designing a matched filter is to obtain the frequency characteristics of each phase of a flow to be analyzed. The most straightforward approach is to detect the spectral flow information using a thermal, optical or acoustical probe in an isolated phase flow, i.e., a flow containing only one particular multiphase flow component. The output of the transducer is then recorded to obtain a record of the frequency characteristic. However, In existing systems, such as nuclear reactors, the individual phases cannot be isolated for an experimental determination of frequency characteristics. In this event, the frequency characteristics of each flow phase can be determined by statistical modeling, such as that described in the following: "Comparisons of the RETRAN two-phase flow model with experimental data," R. K. Fujita and E. D. Hughes, Nuclear Engineering and Design, 55(1979)427-451; and "Numerical Calculation of Flashing from Long Pipes Using a Two-Field Model", W. C. Rivard and M. D. Torrey, Los Alamos Scientific Laboratory—Nuclear Regulatory Commission LAMS-NUREG-6330, Informal Report NRC-1. Either method, experimental or statistical modeling, provides the frequency characteristic of the flow phases necessary for design of a matched filter.

In determining the signal frequency characteristics experimentally, a minimum of two separate experiments are required for a two phase system. In the first experiment, the system is adjusted such that liquid only flows in pipe 16. The signals at probes 10, 12 are $X_{Al}(t)$ and $X_{Bl}(t)$, respectively. These signals are obtained with acoustical probes 10, 12 connected to a tape recorder or other acoustical memory device. The system is then adjusted such that gas only flows in pipe 16. The signals at probes 10, 12 are $X_{Ag}(t)$ and $X_{Bg}(t)$, respectively. Examples of the experimental procedures required are described in "Analysis of Thermal Fluctuations in the Westinghouse Canada Water Loop to Determine Flow Transit Times Using a Transfer Function Cross-Correlation Technique" A. C. Raptis, G. A. Forster and G. G. Popper, Argonne National Laboratory, ANL-CT-77-1, October 1976; "The Analysis of Thermal Fluctuations in the Semiscale Tests to Determine Flow Transmit Delay Times Using a Transfer Function Cross-Correlation Technique", A. C. Raptis, and G. F. Popper, Argonne National Laboratory, ANL-CT-77-17, April 1977; and "Signal Analysis Methods Using Transfer Function Cross-Correlation Techniques", A. C. Raptis, Nuclear Regulatory Commission, NUREG/CP-0015, pp III. 2-1 to III. 2-29, December, 1980.

Having obtained the necessary frequency characteristic information, the design of a matched filter can take two approaches. The first approach is to design an electronic circuit model which might be simple in principle but very complicated to perform in practice due to the unpredictable nature of the signals and the necessity to expedite design via approximation. The second approach is to design a computer program or numerical model which typically affords greater accuracy.

Figure 2:
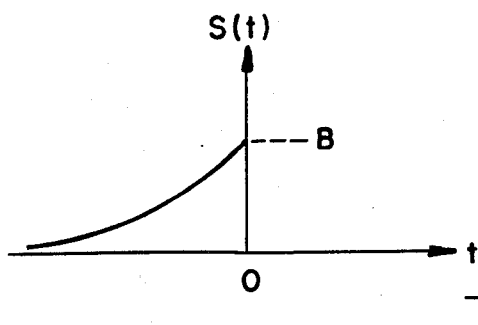
FIGS. 2–6 are graphs showing operation of an exemplar matched filter arrangement.

The electronic circuit approach will be described with reference to a system in which a damped sinusoidal signal S(t) of a phase flow component is corrupted by the additive white noise N(t) of other flow components. A graph of the input signal S(t) is shown in FIG. 2, and S(t) is expressed by the following:

$$S(t) = Be^{bt} \text{ for } t<0, \text{ and}$$

$$S(t) = 0 \text{ for } t \geq 0$$

where B and b are constants.

The frequency transform $S(\omega)$ of this signal is:

$$S(\omega) = \int_{-\infty}^{0} Be^{bt}e^{-j\omega t} dt = \frac{B}{b - j\omega}$$

The matched filter function $H(\omega)$ is:

$$H(\omega) = S(-\omega)e^{-j\omega t_1} = \frac{B}{b + j\omega} e^{-j\omega t_1},$$

where $t_1$ is a selected delay time less than the duration of the signal S(t), i.e. a time window in which S(t) and N(t) coexist.

Figure 3:
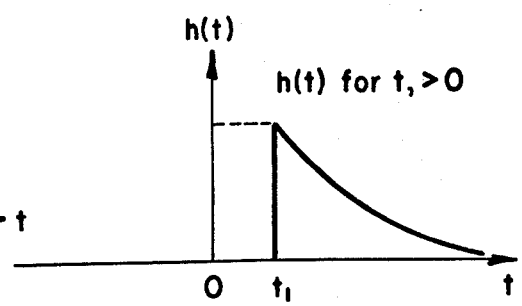
Figure 4:
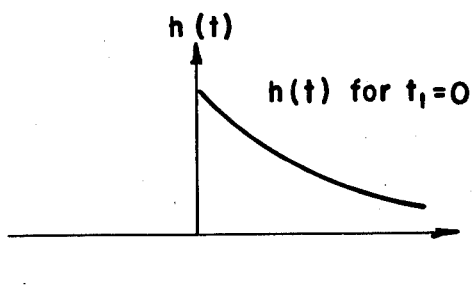

The impulse response of the matched filter is shown in the graphs of FIGS. 3, 4, and is given by:

$$h(t) = S(t_1 - t) = Be^{b(t_1 - t)} \text{ for } t > t_1 \text{ and}$$

$$h(t) = 0 \text{ for } t < t_1$$

The physical realizability requirement that h(t) vanish for negative times is satisfied by taking $t_1 \geq 0$. The simplest choice is $t_1 = 0$, so that:

$$H(\omega) = B/(b+j\omega)$$

$$h(t) = Be^{-bt} \text{ for } t > 0 \text{ and}$$

$$h(t) = 0 \text{ for } t < 0$$

Figure 5:
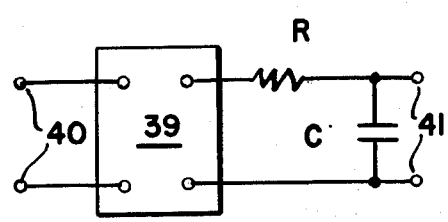

This is recognized with reference to know active or passive network analysis techniques as an RC low pass filter preceded by an ideal amplifier, as shown in FIG. 5. The time constant of the RC network is $RC = 1/b$, and the gain of the ideal amplifier 39 is $B/b$. The signal applied to the input terminals 40 is expressed as: $S(t) + n(t)$. The signal derived from the output terminals is expressed as: $S_o(t) + N_o(t)$. The transform $S_0(\omega)$ of the signal output $S_0(t)$ is:

$$S_0(\omega) = [S_o(\omega) + N_o(\omega)]H(\omega) = \frac{B^2}{b^2 + \omega^2} \text{ and}$$

$$S_0(t) = \frac{1}{2\pi} \int_{-\infty}^{\infty} \frac{B^2}{b^2 + \omega^2} e^{j\omega t} d\omega$$

$$= \frac{B^2}{2b} e^{bt} \text{ for } t < 0 \text{ and}$$

$$= \frac{B^2}{2b} e^{-bt} \text{ for } t > 0,$$

thus indicating a successful recovery of the input signal altered only by a constant multiplier, $(B/2b)$.

Figure 6:
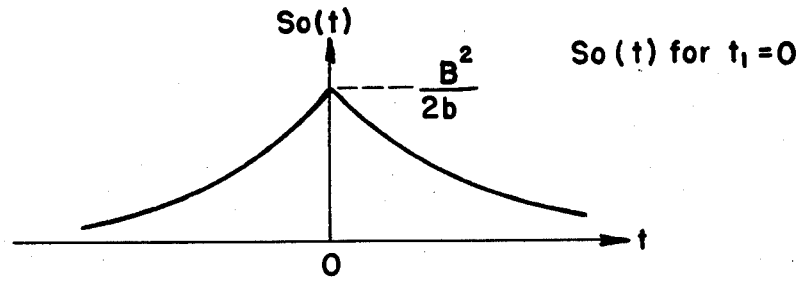

A graph of $S_0(t)$ is shown in FIG. 6.

Other examples of the electronic circuit modeling approach and of active and passive network analysis techniques are set forth in: "The Theory and Design of Chirp Radars", J. R. Klander, A. C. Price, A. C. Darlington, W. J. Albershein, Bell Systems Tech., J. Val 39, pp. 745–780, July 1960; *Radar Signals, An Introduction to Theory and Application*, C. E. Cook and M. Bernfeld, Academic Press, New York, N.Y., 1967; and "Fundamentals of the Theory of Detection of Radar Signals and the Measurement of their Parameters", (Russian) Ya. D. Sherman and V. N. Golikov, *SOVETSKOE Radio*, 1963.

With reference to FIG. 7, a computer model or numerical procedure to determine the matched filter design will be described with respect to the liquid phase flow component. After obtaining the upstream signal $X_{A1}(t)$ and downstream signal $X_{B1}(t)$ at probes 10, 12, respectively, these signals are converted from analog to digital form by A/D converters 42, 43. The digitized time signals are then converted to frequency domain signals $[X_{A1}(\omega)$ and $X_{B1}(\omega)$, respectively] in Fast Fourier transform circuits 44, 46. The conjugate of the transformed signals $[X_{A1}^*(\omega)$ and $X_{b1}^*(\omega)]$ is produced in conjugate circuits 48, 50. A signal $e^{-j\omega t_1}$ is generated in circuits 53, 55, wherein $t_1$ is a time delay which determines the time window in which S(t) and N(t) coexist, i.e., $t_1$ is chosen to sample only $S(t) + N(t)$. This latter signal is multiplied with the output of the conjugate circuits in multipliers 52, 54. The output of these multipliers $[X_{A1}^*(\omega)e^{-j\omega t_1}$ and $X_{B1}^*(\omega)e^{-j\omega t_1}]$ provides the (frequency domain) transfer function $H(\omega)$ of the matched filters.

With reference to FIG. 8, application of matched filter transfer function to the arrangement of FIG. 1 will be described. FIG. 8 shows the general arrangement of any one of the matched filters 24, 26, 34 or 36 of FIG. 1. The time domain input signal provided by probe 10 and amplifier 18, 20 is fed into a Fast Fourier Transform Circuit 60, which transforms the input signal to the frequency domain. This transformed signal is then multiplied with the liquid phase matched filter transfer function 56 of FIG. 7, in multiplier 64. The resultant output from multiplier 64 is the frequency domain liquid phase signal extracted from the gaseous phase and other additive noise spectra. This extracted signal is identical to the output of matched filter 26 of FIG. 1, and hence, cross correlator 30 may be directly applied to these signals to determine the time delay of the liquid phase flow component between probes 10, 12, and hence the velocity of the liquid phase flow component.

The matched filters 34, 36 of the gaseous phase are identical to the arrangement shown in FIG. 8, except that the gas phase transfer function 58 replaces the liquid phase transfer function 56.

Although the above examples show passive measuring systems, the present invention also applies to active measuring systems in which a radiant energy beam is transmitted into a multiphase flow, is modulated, i.e., modified by the turbulence of the flow, and is received by sensors such as those described above.

With reference to FIG. 1, an example of this arrangement is shown wherein radiant energy beams from transmitters 70, 72 are received by probes 10, 12 respectively.

The embodiment of the invention in which an exclusive property or privilege is claimed are defined as follows:

1. A flowmeter for measuring in a multiphase flow, the flow rates of individual phase flow components having their own respective flow disturbance frequency characteristic comprising:
   detecting means for deriving from each of a pair of positions spaced apart in the direction of multiphase flow, an input signal corresponding to flow disturbances in the multiphase flow;
   for each respective phase flow component, a pair of matched filters for filtering said input signals, with each of said pair of matched filters matched to the flow disturbance frequency characteristic of an individual phase flow component to be measured, each of said pair of matched filters generating an output signal corresponding only to the flow of said individual phase flow component being measured; and
   means for comparing the output signals of each of said pair of matched filters to determine the respective delay time between said pair of positions of the corresponding individual phase flow component being measured and to derive thereby the respective flow velocity of said individual phase flow component being measured.

2. The flowmeter of claim 1 wherein said input signals correspond to naturally occuring random disturbances in said multiphase flow, and said detecting means comprises transducers communicating with said multiphase flow.

3. The flowmeter of claim 1 further comprising:
   means located at each of said pair of positions for transmitting into said multiphase flow a beam of radiant energy;

means for receiving respective ones of said transmitted beams of radiant energy coupled through said multiphase flow; and wherein said input signals comprise said beams of radiant energy which are coupled to said receiving means through said multiphase flow so as to be modulated by naturally occuring random disturbances in the multiphase flow.

4. The flowmeter of claim 1 wherein said matched filters comprise:

a. means for obtaining, for each phase flow component to be measured, first and second digital electrical signals corresponding to disturbances in the flow of said phase flow component, by sensing the passage of flow disturbances in the flow of said phase flow component respectively past said pair of positions;

b. means for calculating for each phase flow component with the aid of a digital computer, using respective ones of said first and said second digital electrical signals as a database, pairs of matched filter transfer functions matched to the flow disturbance frequency characteristics of each of said phase flow components, respectively; and c. means for filtering with the aid of the digital computer each of said input signals to obtain matched filter output signals corresponding to respective ones of said individual phase flow components, by multiplying said input signals with pairs of matched filter transfer functions which are matched to the flow disturbance frequency characteristics of each of said individual phase flow components, respectively.

5. A method of measuring in a multiphase flow, the flow rates of phase flow components having their own respective flow disturbance frequency characteristics, comprising the steps of:

a. for each phase flow component, obtaining first and second digital electrical signals corresponding to disturbances in the flow of said phase flow component, by sensing the passage of flow disturbances in the flow of said phase flow component respectively past a pair of positions spaced apart in the direction of multiphase flow;

b. calculating for each phase flow component with the aid of a digital computer, using respective ones of said first and said second digital electrical signals as a database, pairs of matched filter transfer functions matched to the flow disturbance frequency characteristics of each of said phase flow components, respectively;

c. obtaining third and fourth digital electrical signals corresponding to disturbances in the multiphase flow by sensing the passage of flow disturbances in the multiphase flow respectively past said pair of positions;

d. filtering with the aid of the digital computer each of said third and said fourth signals to obtain pairs of matched filter output signals corresponding to respective ones of said phase flow components, by multiplying said third and said fourth signals with pairs of matched filter transfer functions which are matched to the flow disturbance frequency characteristics of respective ones of said phase flow components; and e. comparing each of said pairs of matched filter output signals to determine the delay between said pair of positions of each phase flow component being measured, respectively.

6. The method of claim 5 further comprising the steps of:

a. updating for each phase flow component, said first and said second digital electrical signals by sensing the passage of flow disturbances in the flow of said phase flow component respectively past the pair of positions to obtain updated first and second digital electrical signals for each phase flow component, respectively;

b. updating for each phase flow component being measured, said matched filter transfer functions, by calculating with the aid of the digital computer using respective ones of said updated first and second digital electrical signals as a database, updated pairs of matched filter transfer functions matched to the flow disturbance frequency characteristics of each of said phase flow components being measured, respectively.

c. filtering with the aid of the digital computer each of said third and fourth signals to obtain updated pairs of matched filter output signals corresponding to respective ones of said phase flow components, being measured by multiplying said third and fourth signals with pairs of updated matched filter transfer functions matched to the flow disturbance frequency characteristics of each of said phase flow components, respectively.

* * * * *